Jan. 10, 1956  J. F. BRUNDAGE  2,730,029
TOOL MOUNTING AND ADJUSTING MECHANISM FOR TRACTORS
Filed July 16, 1952  4 Sheets-Sheet 1
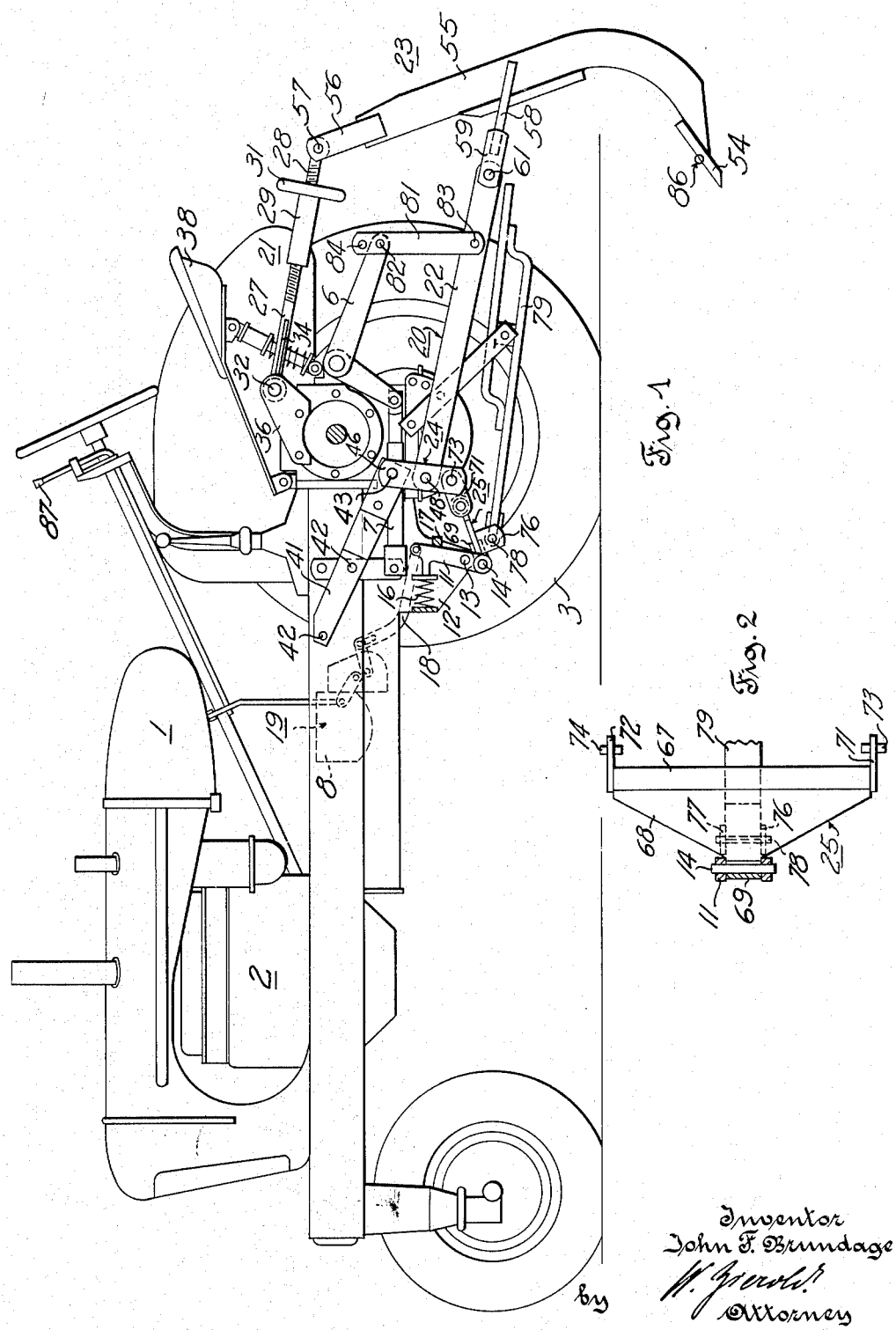
Inventor
John F. Brundage
by
Attorney

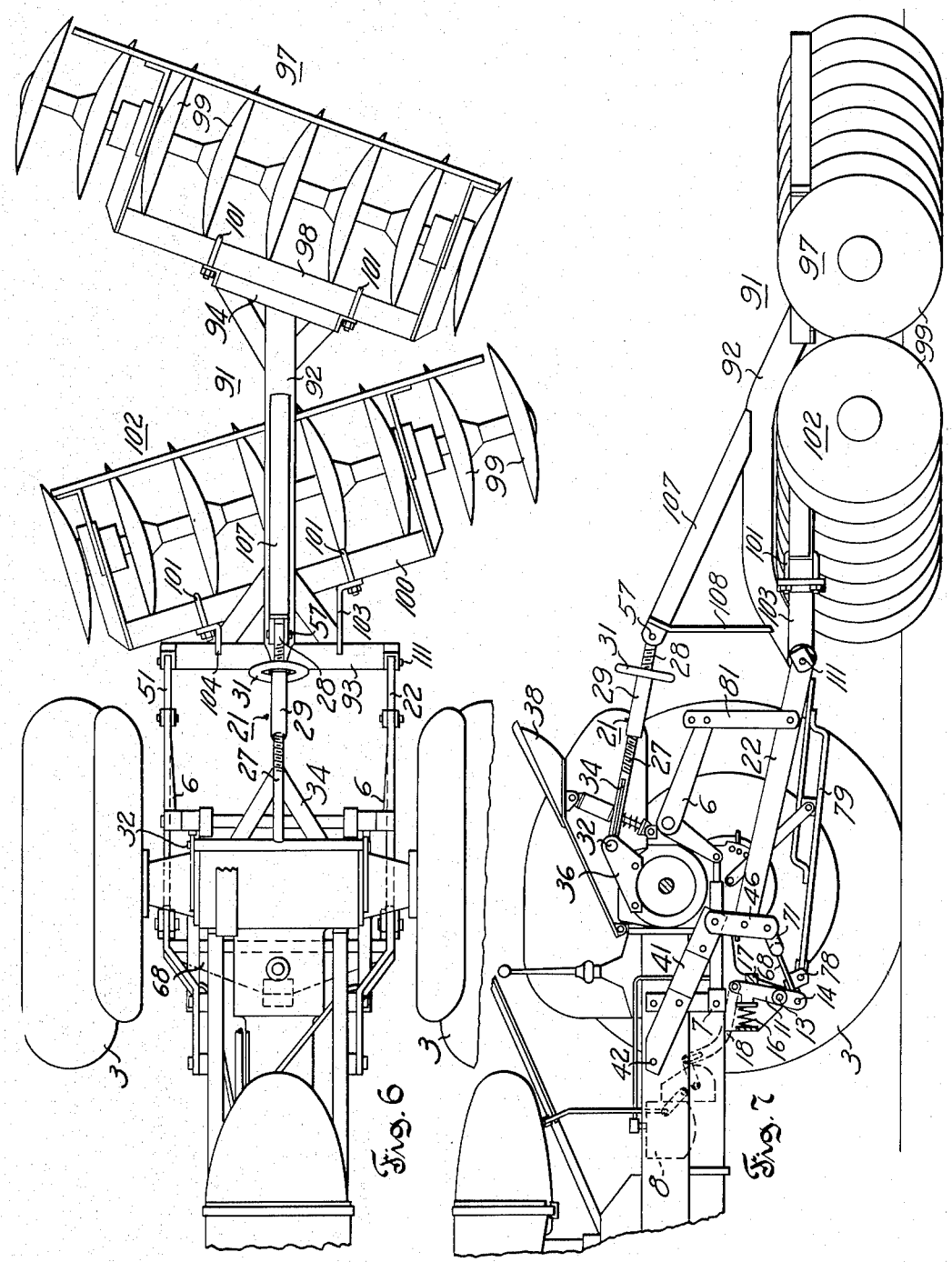

United States Patent Office 2,730,029
Patented Jan. 10, 1956

2,730,029

TOOL MOUNTING AND ADJUSTING MECHANISM FOR TRACTORS

John F. Brundage, Camarillo, Calif., assignor to Allis-Chalmers Manufacturing Company, Milwaukee, Wis.

Application July 16, 1952, Serial No. 299,090

7 Claims. (Cl. 97—46.07)

The invention relates to earth working tools for use on tractors and the like, and it is concerned more particularly with a tool mounting and adjusting mechanism by means of which a tool or a group of tools may be readily mounted on and removed from a tractor, and which mechanism lends itself for use with and operation by a conventional type of automatic depth regulating mechanism.

Automatic depth regulating mechanisms of various types for use in connection with tractor operated tillage tools and the like are well known and widely used. In accordance with prevailing practice, control of such mechanisms is effected by means of a pivoted, spring biased control lever and by means of a draft tongue or coupling link which is suitably connected with the spring biased control lever so as to actuate the latter in response to draft load changes to which the draft tongue or coupling link becomes subjected during operation of the tractor in the field. A relatively heavy spring is usually employed to bias the control lever in one direction and to yieldingly oppose its movement in the opposite direction, movement of the lever in said one direction being effective to increase the working depth of the tool or tools, and movement of the control lever in said opposite direction being effective to decrease the working depth of the tool or tools.

When an automatic depth regulating mechanism of the hereinabove outlined character is employed in connection with a trail-behind implement, as for instance a wheeled plow, a tractor drawbar is usually connected at its forward end with the spring biased control lever, and the plow is hitched to the rear end of the tractor drawbar. On the other hand, if the tool or implement to be controlled by the automatic depth regulating mechanism is mounted on the tractor by means of what is known as a converging link system, it is usually necessary to adapt the control lever mounting and particularly the biasing spring to that type of tool mounting, the deflection characteristics of the biasing spring required in the latter case being substantially different from those required when the control lever is directly actuated by the tractor drawbar.

The principal object of the present invention is to provide an improved tool mounting and adjusting mechanism of the parallel or converging link type, and which mechanism lends itself to control by an automatic depth regulating mechanism having a biasing spring of the same deflection characteristics as those normally required in connection with drawbar connected trail-behind implements.

A desirable location of the spring biased control lever on the tractor is at the underside of a rear part of the tractor main body, and it is customary to mount the control lever on a pivot center intermediate its ends, to arrange the biasing spring so that it will react between an abutment on the tractor main body and an upper part of the control lever, and to hinge the tractor drawbar to a lower part of the control lever. An automatic depth regulating system incorporating such a control lever and spring arrangement is disclosed and claimed in a copending application Serial Number 29,234, filed on May 26, 1948, and on which U. S. Patent 2,679,199, dated May 25, 1954, has been granted to Walter F. Strehlow, for Power Lift Means Affording Depth Regulation of Tractor Propelled Implements.

The present invention contemplates and has among its more specific objects the provision of an improved tool mounting and adjusting mechanism which lends itself for use in connection with and operation by an automatic depth regulating system incorporating a control lever and biasing spring arrangement at the underside of the tractor main body as outlined hereinbefore.

Another object of the invention is to provide an improved tool mounting and adjusting mechanism of the character outlined hereinbefore incorporating an actuating element which may be attached to the spring biased control lever in lieu of the tractor drawbar, and also incorporating an auxiliary support to which the tractor drawbar may be connected after it has been detached from the lower end of the spring biased control lever.

A further object of the invention is to provide an improved tool mounting and adjusting mechanism of the hereinabove outlined character which permits selective arrangement of its component parts for operation either with or without automatic depth regulation.

A further, more specific object of the invention is to provide a disk harrow mounting and adjusting mechanism for tractors incorporating the various features of improvement outlined hereinbefore and also a simple, sturdy and relatively inexpensive mounting frame for a pair of front and rear disk gangs.

The foregoing and other objects and advantages are attained by the present invention, various novel features of which will be apparent from the description herein and the accompanying drawings disclosing typical embodiments of the invention, and are pointed out in the appended claims.

In the drawings:

Fig. 1 is a side view of a tractor and subsoiler attachment, with the near traction wheel removed to more clearly show the subsoiler mounting and adjusting mechanism;

Fig. 2 is an enlarged top view of a control link structure forming part of the mechanism shown in Fig. 1;

Fig. 6 is a plan view of a disk harrow mounted on the rear portion of the tractor through an implement mounting and adjusting mechanism of the type shown in Fig. 1; and Fig. 7 is a side view of the structure shown in Fig. 6.

Figure 3:
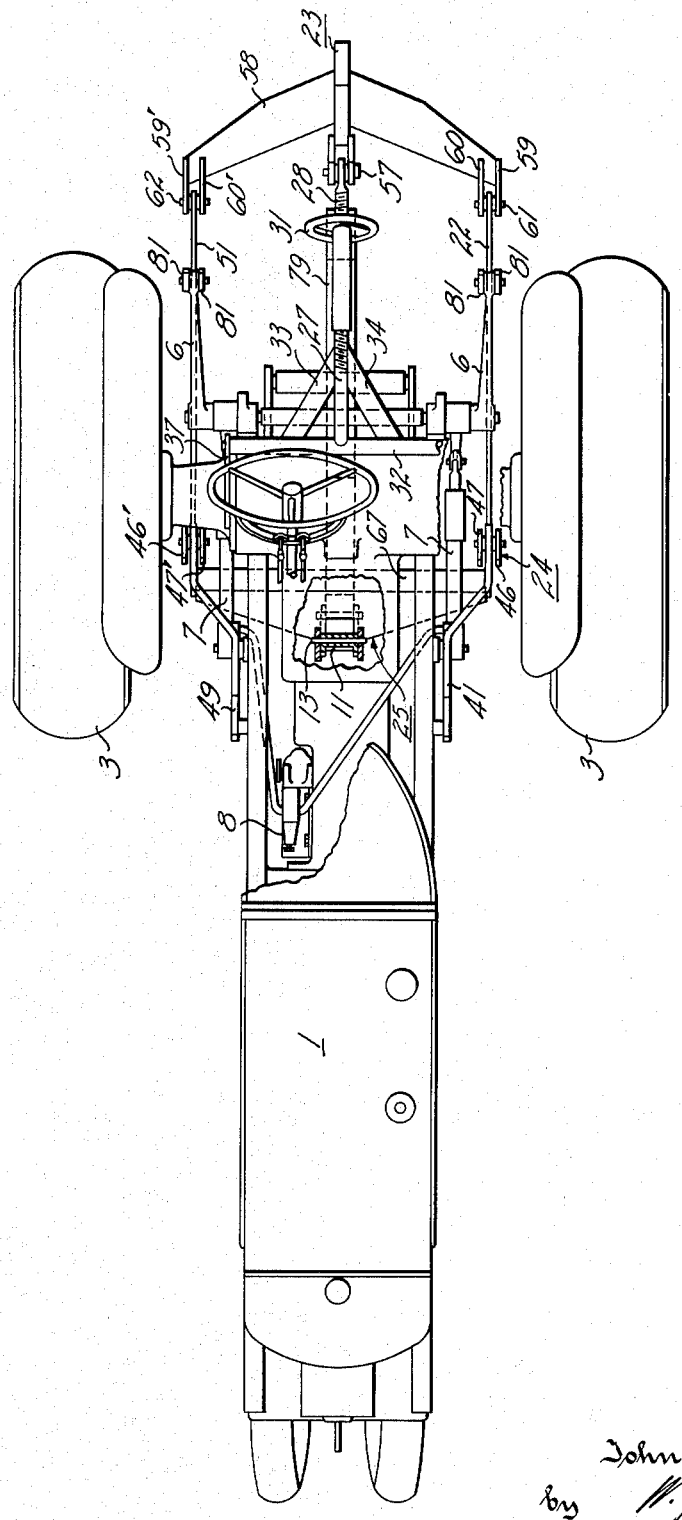
Fig. 3 is a plan view of the tractor and subsoiler shown in Fig. 1 with portions of the tractor broken away to expose parts at the underside of the tractor.

In Fig. 1, a tool mounting embodying the present invention is shown applied to a conventional wheel type tractor generally designated by the reference character 1 and comprising an engine 2, a pair of drive wheels 3, and a power life mechanism including lift arms 6, a pair of rams 7 and a hydraulic pump 8 for actuating the rams.

The tractor 1 is also provided with an automatic depth regulating mechanism of the type disclosed in the aforementioned copending application. The depth regulating mechanism includes a draft transmitting hitch element or control lever 11 positioned between and carried by plate members 12 for swinging movement relative thereto about a transverse axis afforded by a pin 13 which extends through aligned openings in opposed lower portions of the plate members 12 and through an intermediate portion of the lever 11. The lower portion of the lever is bifurcated and has aligned transverse openings adapted to receive a coupling pin 14 for connecting a drawbar or other draft transmitting structure to the lower end of the lever 11, the pin 14 being readily insertable and withdrawable in conventional manner. Forward movement of the upper end of the lever in response to increase of a draft load acting upon the lower part of the lever 11 is resisted by a resilient means such as a relatively heavy coil spring 16 seated on a cross member between forward portions of the plate members 12 and bearing rearwardly upon the upper end of the lever 11. Swinging movement of the lever 11 on its pivot center at 13 in clockwise direction, as viewed in Fig. 1, is limited by a stop 17 mounted on the plates 12. A link 18 is connected with the control lever 11 for back and forth movement by the latter, and a suitable hydraulic mechanism, generally designated by the reference character 19, which is controlled by the link 18, includes a pump 8 for operating the rams 7. Generally, the hydraulic system functions to swing the lift arms 6 upwardly upon rearward movement of the lower end of lever 11, and to permit downward swinging of the lift arms 6 upon forward movement of the lower end of lever 11.

The tool mounting and adjusting mechanism comprises a pair of upper and lower coupling links, one representing a compression link structure generally designated by the reference character 21 and the other a tension link structure 20. A rigid, substantially vertical implement or tool mounting structure is generally designated by the reference character 23 and connected with the link structures 20, 21 as will be explained more fully hereinbelow. Auxiliary link means generally designated by the reference character 24 are connected at one end to the tractor 1 and at an intermediate portion thereof to the tension link structure 20. A thrust transmitting means or control link structure generally designated by the reference character 25 connects the auxiliary link means 24 with the control lever 11. Auxiliary link means 24 and control link structure 25 define a pair of hitch links swingably connected with each other at a common pivot center 73.

Referring to Figs. 1 and 3, the compression link structure 21 is made up of two axially aligned strut elements 27 and 28 which have right and left hand threads, respectively, at their adjacent ends to receive corresponding internal threads of a collar 29 having a handwheel 31 rigidly attached thereto. The forward strut element 27 is rigidly attached to a front cross member 32, and as seen in Fig. 3, the member 32 is rigidly braced to the strut 27 by diagonal braces 33 and 34. The cross member 32 and the attached strut elements are supported for vertical swinging movement on brackets 36 and 37 which are rigidly attached to the sides of the tractor. The rear end portion of the rear strut 28 is provided with an aperture to receive a pivot pin 57 for connecting the tool mounting structure 23 to the compression link structure 21. It will also be noted that the handwheel 31 is within easy reach of an operator sitting on a tractor seat 38, and permits selective lengthening and shortening of the effective length of the compression link structure 21.

Referring to Figs. 1 and 3, a pair of link straps 46 and 47 forming part of the auxiliary link structure 24 are connected to the tractor through a bracket 41 which is mounted on the left tractor side channel and secured thereto by means of studs or bolts 42. As shown in Fig. 3, an intermediate portion of the bracket 41 is bent outwardly from the side of the tractor and the rear portion of the bracket is bent to parallel the side channel of the tractor. The link straps 46 and 47 are pivotally and detachably mounted on the rear end portion of the bracket 41 by means of a pin 43 which is insertable into and withdrawable from aligned openings in the upper portions of the link straps 46 and 47 and in the end portion of bracket 41, the pin 43 providing a first pivot center about which the auxiliary link structure 24 may swing relative to the tractor. A link strap 22 forming part of the tension link structure 20 is positioned between straps 46 and 47 of the auxiliary link structure and is detachably connected thereto for pivotal movement about a second pivot center afforded by a pin 48 which is insertable into and withdrawable from aligned openings in the tension link strap 22 and in the members 46 and 47. The tension link strap 22 extends rearwardly from the pin 48 and terminates in an end portion adapted for connection to the tool mounting structure 23.

While the bracket 41, auxiliary link straps 46 and 47 and tension link strap 22 have been described as being on the near side of the tractor as shown in Fig. 1, it will be noted from Fig. 3 that a similar bracket 49, auxiliary link straps 46' and 47' and a tension link strap 51 are mounted on the right side of the tractor, the link strap 51 forming part of the tension link structure 20.

The rigid, substantially vertical tool mounting structure 23 shown in Fig. 1, comprises a plate metal beam 55, the upper portion of which has a pair of straps 56 rigidly attached in side abutting relation to the sides of the beam and in parallel relation to each other. The upper ends of the straps 56 are provided with aligned openings for detachably receiving the pin 57 which also passes through an opening in the rear end of the compression link structure 21. This pin provides an upper pivot center for the compression link structure 21 on the tool mounting structure 23. Mounted on the lower portion of the plate metal beam 55 is a subsoiler shoe 54, and at an intermediate portion of the beam 55 a plate metal cross member 58 is rigidly attached to the beam 55 and extends horizontally at opposite sides of the latter. A pair of parallel spaced straps 59 and 60 are rigidly attached to one of the outer ends of the cross member 58 and similar straps 59', 60' are attached to the other end of the cross member. The two pairs of straps 59, 60 and 59', 60' are provided with aligned openings for receiving detachable pins 61 and 62, respectively, which also pass through openings in the ends of the tension link straps 22, 51 and afford a single transverse axis or lower pivot center for the tension link straps 22, 51 on the tool mounting structure 23.

The hitch link or control link structure 25, which is shown in detail in Fig. 2, is operatively interposed between the other hitch link or auxiliary link structures 24 and the spring biased control level 11. Referring to Fig. 2, the control link structure 25 comprises a tubular cross member 67 and a triangular plate member 68 rigidly attached to the forward side of the cross member 67. A generally U-shaped hinge strap 69 is rigidly attached to a forward portion of the triangular plate member 68, upper and lower leg portions of the strap 69 being welded to top and bottom surfaces, respectively, of the triangular plate 68. The forward edge of the plate member 68 and the inside portion of the hinge strap 69 form an aperture which, in the condition of the parts as shown in Fig. 1, is positioned in alignment with the openings in the bifurcated end of the lever 11 to receive the detachable connecting means such as pin 14. Straight plate metal hinge straps 71 and 72 are rigidly connected to the outer ends, respectively, of the tubular cross member 67, and each of the hinge straps 71 and 72 has a pin receiving opening in the free end thereof on an axis parallel to and rearwardly of the tubular cross member 67. The openings in the hinge straps 71 and 72 are positioned in alignment with openings in the lower ends of the link straps 46, 47 and 46', 47', respectively, to receive withdrawable pivot pins 73 and 74. This latter connection provides a third and common pivot center affording swinging movement of the auxiliary link structure 24 relative to the control link structure 25.

A pair of drawbar supporting brackets 76 and 77 are rigidly mounted on the underside of the triangular plate member 68 in edge abutting relation to the lower leg of the hinge strap 69 and are provided with transversely aligned openings adapted to withdrawably receive a drawbar connecting pin 78 affording attaching means for a tractor drawbar 79, the latter being slidably supported intermediate its ends on the tractor in any suitable manner and having a rear end for connection, if desired, with a trail-behind implement, not shown.

Figure 5:
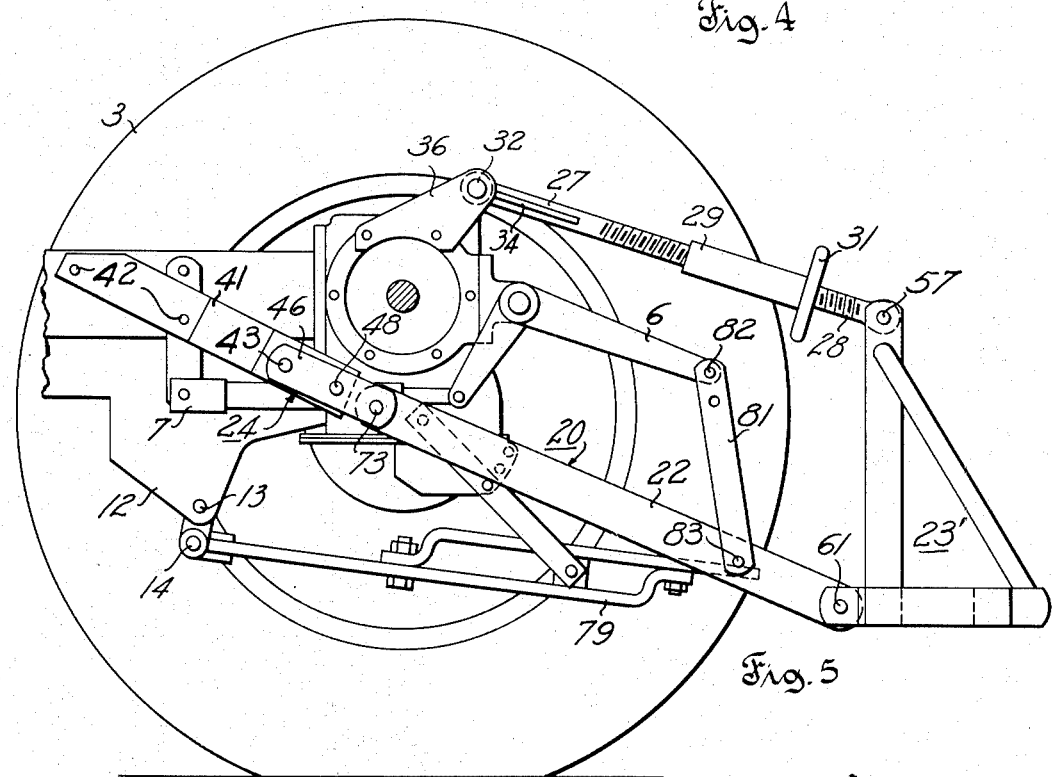
Fig. 5 is a side view of an implement attaching and adjusting mechanism of the type shown in Fig. 1, with component parts of the mechanism rearranged for operation without automatic depth control.

The lift arms 6 are connected to the tension link straps 22 and 51 by a pair of lift links, each lift link comprising a pair of strap members 81 positioned on opposite sides of the respective lift arm and tension link strap, and pivotally connected to the respective lift arm 6 by means of a pin 82. The lower portions of the straps 81 are provided with apertures in alignment with a similar aperture in the respective tension link strap to receive a pivot pin 83. It will be noted that the upper portions of the straps 81 are provided with additional aligned openings 84 to selectively receive the pins 82 as shown in Fig. 5.

By means of the handwheel 31 in Fig. 1 the tool mounting structure 23 may be adjusted angularly with respect to a vertical transverse plane and retained in any selected position of such angular adjustment. Rotation of the handwheel 31 changes the length of the compression link 21 with the result that the tool mounting structure pivots about the pins 61 and 62 which join the tension link straps 22 and 51 with the tool mounting structure 23.

In operation, when the tractor moves forwardly and the subsoiler shoe 54 engages the ground, the reaction load acting upon the subsoiler shoe may be considered as being concentrated at a ground reaction center whose approximate location is indicated in Fig. 1 by the reference character 86. The load imposed at the point 86 tends to swing the tool mounting structure 23 rearwardly about the pin 57. As a result, the link 21 becomes subject to compression and the links 22 and 51 to tension. The resulting rearward pull on the tension links 22 and 51 tends to swing the auxiliary link structure 24 rearwardly about the pivot pins 43. Rearward swinging of the auxiliary link structure 24 is transmitted through the control link structure 25 to the control lever 11, so that the latter will pivot about the pin 13 in a direction to compress the spring 16.

Increase and decrease of the load acting upon the subsoiler shoe 54, as the latter moves through the ground, will cause forward or rearward movements, respectively, of the upper part of the control lever 11 and consequent actuation of the control link 18. As a result of such actuation of the link 18, the hydraulic mechanism 19 becomes operative upon an increase of the draft load to extend the rams 7 and thereby raise the tool mounting structure 23 until the draft load returns to a predetermined, normal value; and the hydraulic mechanism 19 becomes operative upon a decrease of the draft load to cause contraction of the rams 7 and consequent lowering of the tool mounting structure 23 until the draft load again returns to the mentioned predetermined value.

It will be noted that the load on the tension links 22 and 51 will be considerably greater than the reaction load acting at the ground reaction center 86 because the lever arm from pin 57 to the ground reaction center 86 is much longer than the lever arm from the pin 57 to the axis of pins 61 and 62. The auxiliary link structure 24 is constructed so that the lever arms from the axis of pins 43 to pins 73 are proportioned relative to the lever arms from the axis of pins 43 to the axis of pins 48 at the same ratio as that at which the lever arm from the pin 57 to the ground reaction center 86 is proportioned relative to the lever arm from the pin 57 to the axis of the pivot pins 61 and 62. Due to this relation of the lever arms afforded by the tool mounting structure 23 and the lever arms afforded by the auxiliary link structure 24, the draft load on the drawbar coupling pin 14 is equal or substantially equal to the reaction load effective at the ground reaction center 86.

Figure 4:
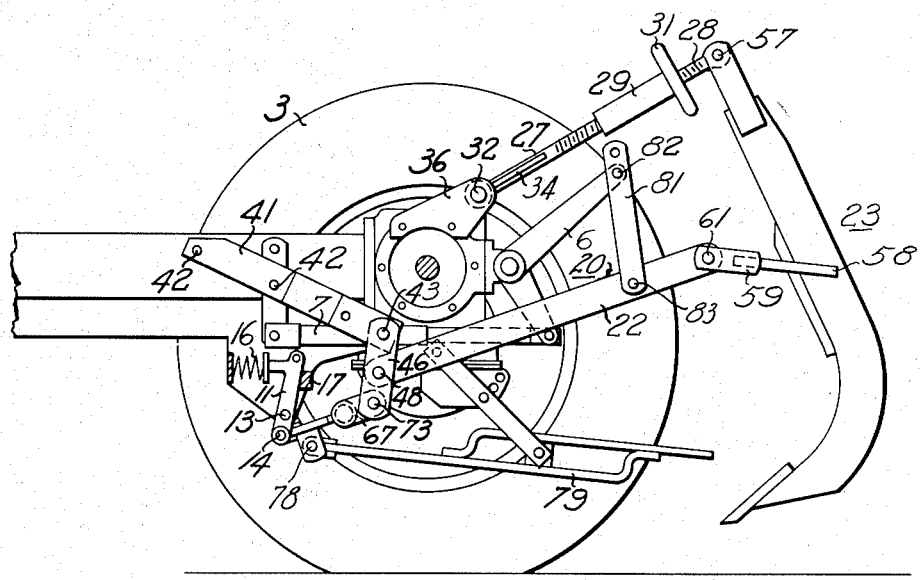
Fig. 4 is a side view of the rear portion of the tractor and subsoiler mounting and adjusting mechanism shown in Fig. 1 with the subsoiler raised to a transport position.

If desired, the tool mounting structure 23 may be moved to a transport position as shown in Fig. 4. To that end, the operator may control the hydraulic system manually by means of a lever 87 so that the rams 7 will expand and the lift arms 6 will swing to the raised position in which they are shown in Fig. 4. In that condition the tool mounting structure 23 will be sustained by the straps 81 in coaction with the links 21, 22, 24, 25, 51, control lever 11 and stop 17.

Under certain conditions or when utilizing different types of tools, automatic depth control may not be desirable. In that case, component parts of the structure shown in Figs. 1, 3 and 4 may be rearranged as shown in Fig. 5. To that end, the auxiliary link structure may be rigidly mounted on the brackets 41, 49 in the position shown in Fig. 5 by means of pins 43 and 48 which in the arrangement shown in Figs. 1 and 3, connect the auxiliary link structure 24 to the brackets 41, 49 and the tension link structure 20 to the auxiliary link structure 24. The pin openings of the auxiliary link structure 24 which receive pins 73 and 74 in the illustrated embodiment of the invention in Fig. 1, are used to pivotally connect the tension links 22 and 51 to the auxiliary link structure 24 as now shown in Fig. 5. The control link 25 is disconnected and removed, and the tractor drawbar 79 may be retained and connected to the lever 11 by means of pin 14. In lieu of the subsoiler shown in Fig. 1, a universal tool carrier 23' is shown in Fig. 5, the carrier 23' presenting a rigid, generally upright tool mounting structure the same as the parts 55 and 58 of the subsoiler shown in Fig. 1.

A modified embodiment of the invention is shown in Figs. 6 and 7. As shown in these figures, a disk harrow, generally designated by the reference character 91, comprises a tubular upwardly arched longitudinal frame member 92, and a forward transverse tubular frame member 93 which is rigidly connected intermediate its ends to the forward end of the longitudinal frame member 92. An obliquely disposed rear frame member 94 is rigidly connected to the rear end of the arched longitudinal frame member 92. A rear disk gang 97 comprising a series of axially aligned disks 99 is mounted on a gang frame 98 for rotation on an axis extending parallel to the obliquely disposed rear frame member 94. A front cross member of the gang frame 98 is secured to the rear frame bar 94 by means of a pair of U-bolts 101 which permit attachment, detachment and endwise adjustment of the rear disk gang 97 in the direction of its axis relative to the rear frame bar 94. A front disk gang 102, similar in construction to the rear disk gang 97, comprises another series of axially aligned disks 99 which are mounted in a gang frame 100 for rotation on an axis extending obliquely to the front and rear frame members 93 and 94. The front gang frame 100 is adjustably secured by another pair of U-bolts 101 to a bracket 103 and to a somewhat shorter bracket 104, each of the brackets 103 and 104 being rigidly secured to the forward transverse front frame member 93. It will be noted that the front disk gang 102 and the rear disk gang 97 are positioned in axially converging relation to each other on the frame structure 92, 93, 94, and are adjustable thereon independently of each other toward more or less laterally offset positions with respect to the tractor.

A tubular strut member 107 is rigidly attached at its rear end to a portion of the arched frame member 92 intermediate the front and rear ends of the latter in an upwardly and forwardly extending position. The elevated forward end of the strut 107 has a forked portion adapted to receive the hereinbefore mentioned pin 57 for pivotally connecting the harrow to the compression link 21. A vertical brace strap 108 is rigidly connected at its lower end with the arched frame member 92 and at its upper end with the elevated forward portion of the strut member 107. A rigid implement mounting structure is formed and includes arched frame member 92, tubular strut member 107 and brace strap 108. The implement mounting structure has upper and lower pivot centers at pins 57 and 111, respectively. Attachment of the disk harrow to the tractor is completed by pins 111 which are inserted through the apertures provided in the rear ends of the tension links 22 and 51, and through suitable pin receiving lugs at the axially opposite ends of the forward transverse frame member 93.

The explanations hereinbefore with reference to the mode of operation of the apparatus shown in Figs 1 to 5 analogously apply to the disk harrow shown in Figs 6 and 7. Each illustrated embodiment of the invention provides for operation of a ground engaging tool selectively with or without automatic depth control, and when automatic depth control is being utilized, the disclosed mechanism functions to impose a load on the spring biased control lever 11 which is equal or approximately equal to the reaction load acting upon the tool at its theoretical center of ground resistance. Accordingly, the herein disclosed tool mounting and adjusting mechanism may be used in connection with an automatic depth regulating control mechanism which has a spring biased control lever for direct connection with a tractor drawbar, and the same biasing spring 16 which is provided for operation in conjunction with a drawbar actuated control lever may be retained for operation in conjunction with a tool mounting and adjusting mechanism of the herein disclosed character.

It should be understood that it is not intended to limit the invention to the particular forms and details described hereinabove and that the invention includes such other forms and modifications as are embraced by the scope of the appended claims.

It is claimed and desired to secure by Letters Patent:

1. In combination with a tractor, a tool supporting and adjusting means comprising: a compression link structure pivotally supported on said tractor for vertical swinging movement relative thereto; a pair of brackets fixedly mounted on said tractor in transversely spaced parallel relation to each other, said brackets each presenting a pair of similar attaching center components fixedly spaced longitudinally of the tractor below said compression link structure with the components on one bracket transversely aligned with those on the other bracket; a pair of auxiliary links each having a first attaching center adjacent one end thereof, a second attaching center disposed intermediate the ends of the link and being spaced from said first center a distance equal to the spacing between said pair of components on each of said brackets, and a third attaching center disposed adjacent the other end of the link; separable fastening means rendering said auxiliary links selectively rigidly and pivotally connectable with said brackets through coaction of said first and second attaching centers with said pairs of attaching components and through coaction of said first attaching center with the rear ones of said components, respectively, said auxiliary links being connected with said brackets through coaction of said first attaching centers with said rearmost ones of said components; a tension link structure pivotally detachably supported on said auxiliary links at said second attaching centers thereof; a power lift mechanism operatively carried by said tractor for raising and lowering an implement connected therewith; a control link structure pivotally connected with said auxiliary links at said third attaching centers thereof, said control link structure being connected with and rendering said power lift mechanism operative to effect said raising and lowering movements in response to an element of said control link moving as a result of variations in draft induced force transmitted thereto through said tension link structure; a hitch means for a trailing implement carried by said element of said control linkage whereby draft control may be utilized with an implement whether coupled with said tractor through said hitch means or through said compression and tension link structures; a tool mounting structure presenting generally rigid vertically spaced portions pivotally supportedly connected with said compression and tension link structures, respectively; a ground working tool means carried by said mounting structure in a predetermined relation such that the ground reaction center on said tool means is spaced from said mounting structure connection with said compression link structure a distance greater than that between said ground reaction center and said mounting structure connection with said tension link structure in substantially the same proportion as that in which the relative spacing of said first and third attaching centers of said auxiliary link means is greater than the relative spacing of said second and third attaching centers of said auxiliary link means.

2. In combination with a tractor, a tool supporting and adjusting means comprising: a compression link structure pivotally supported on said tractor for vertical swinging movement relative thereto; a pair of brackets fixedly mounted on said tractor in transversely spaced parallel relation to each other, said brackets each presenting a pair of similar attaching center components fixedly spaced longitudinally of the tractor below said compression link structure with the components on one bracket transversely aligned with those on the other bracket; a pair of auxiliary links each having a first attaching center adjacent one end thereof, a second attaching center disposed intermediate the ends of the link and being spaced from said first center a distance equal to the spacing between said pair of components on each of said brackets, and a third attaching center disposed adjacent the other end of the link; separable fastening means rendering said auxiliary links selectively rigidly and pivotally connectable with said brackets through coaction of said first and second attaching centers with said pairs of attaching components and through coaction of said first attaching center with the rear ones of said components, respectively, said auxiliary links being connected with said brackets through coaction of said first attaching centers with said rearmost ones of said components; a tension link structure pivotally detachably supported on said auxiliary links at said second attaching centers thereof; a power lift mechanism operatively carried by said tractor for raising and lowering an implement connected therewith; a control link structure pivotally connected with said auxiliary links at said third attaching centers thereof, said control link structure being connected with and rendering said power lift mechanism operative to effect said raising and lowering movements in response to an element of said control link moving as a result of variations in draft induced force transmitted thereto through said tension link structure; and a hitch means for a trailing implement carried by said element of said control linkage whereby draft control may be utilized with an implement whether coupled with said tractor through said hitch means or through said compression and tension link structures.

3. In combination with a tractor, a tool supporting and adjusting means comprising: a compression link structure pivotally supported on said tractor for vertical swinging movement relative thereto; a pair of brackets fixedly mounted on said tractor in transversely spaced relation to each other, said brackets each presenting a pair of similar attaching center components fixedly spaced longitudinally of the tractor below said compression link structure with the components on one bracket transversely aligned with those on the other bracket; a pair of auxiliary links each having a first attaching center adjacent one end thereof, a second attaching center disposed intermediate the ends of the link and being spaced from said first center a distance equal to the spacing between said pair of components on each of said brackets, and a third attaching center disposed adjacent the other end of the link; separable fastening means rendering said auxiliary links selectively rigidly and pivotally connectable with said brackets through coaction of said first and second attaching centers with said pairs of attaching components and through coaction of said first attaching center with the rear ones of said components, respectively; a tension link structure pivotally detachably supported on said auxiliary links through coaction with attaching centers thereof spaced from said brackets; and a power lift mechanism operatively connected with said tension link structure for raising and lowering same relative to said tractor.

4. An agricultural machine comprising, in combination, a tractor body, a draft transmitting element movably mounted on said tractor body and having a hitch portion in fore and aft movable relation to the latter; a pair of hitch links swingably connected with each other at a common pivot center; detachable connecting means between said hitch portion of said draft transmitting element and one of said hitch links; pivot means connecting the other of said hitch links and said tractor body on a first center spaced a predetermined distance from said common pivot center of said hitch links; a rigid implement mounting structure; upper and lower coupling link structures pivotally connected at upper and lower pivot centers, respectively, with said implement mounting structure; pivot means operatively connecting said upper coupling link structure with said tractor body; other pivot means operatively connecting said lower coupling link structure with said other hitch link on another center spaced from said first center a second predetermined distance shorter than said first predetermined distance; a ground engaging tool connected with said implement mounting structure so as to afford a ground reaction center in downwardly spaced relation to said upper and lower coupling link structures; and a resilient element operatively interposed between said draft transmitting element and said tractor body, so as to yieldingly resist movement of the latter upon transmission of draft induced force thereto through said lower coupling link structure and said pivotally connected hitch links.

5. An agricultural machine as set forth in claim 4, wherein said common pivot center between said hitch links, and said pivot means which connect said other of said hitch links with said tractor body, are positioned at opposite ends, respectively, of said other hitch link; and wherein said other pivot means, which swingably connect said lower coupling link structure with said other hitch link, are positioned intermediate said opposite ends of said other hitch link.

6. An agricultural machine comprising, in combination, a tractor body, a draft transmitting element movably mounted on said tractor body and having a hitch portion in fore and aft movable relation to the latter; a pair of hitch links swingably connected with each other at a common pivot center; detachable connecting means between said hitch portion of said draft transmitting element and one of said hitch links; pivot means swingably connecting the other of said hitch links with said tractor body on a center spaced a first predetermined distance from said common pivot center of said hitch links, a rigid implement mounting structure, upper and lower coupling link structures pivotally connected at upper and lower pivot centers, respectively, with said implement mounting structure, pivot means operatively connecting said upper coupling link structure with said tractor body; other pivot means swingably connecting said lower coupling link structure with said other hitch link on another center spaced from said first center a second predetermined distance shorter than said first predetermined distance; ground engaging tool means connected with said implement mounting structure so as to afford a ground reaction center in downwardly spaced relation to said upper and lower coupling link structures, the ratio between the spacings of said upper pivot center from said reaction center and from said lower pivot center, respectively, being equal or substantially equal to the ratio between said first and second predetermined distances; and a resilient element operatively interposed between said draft transmitting element and said tractor body, so as to yieldingly resist movement of the latter upon transmission of draft induced force thereto through said lower coupling link structure and said pivotally connected hitch links.

7. In an agricultural machine as set forth in claim 6, an implement mounting structure comprising a transverse frame member pivotally connected at its opposite ends with said lower coupling link structure on said lower pivot center, a longitudinal frame member rigidly connected with and extending rearwardly from said transverse frame member, a strut member rigidly connected with and extending upwardly and forwardly from a rearward portion of said longitudinal frame member, said strut member being pivotally connected at its forward end with said upper coupling link structure; and ground engaging tool means comprising front and rear disk gangs operatively mounted, respectively, on said transverse frame member and at the rear end of said longitudinal frame member.

References Cited in the file of this patent

UNITED STATES PATENTS

| | | |
|---|---|---|
| 1,687,719 | Ferguson | Oct. 16, 1928 |
| 2,352,963 | McMahon | July 4, 1944 |
| 2,356,231 | Ferguson | Aug. 22, 1944 |
| 2,664,804 | O'Harrow | Jan. 5, 1954 |
| 2,683,403 | Flentie | July 13, 1954 |